United States Patent [19]
Strausbaugh et al.

[11] Patent Number: 5,003,682
[45] Date of Patent: Apr. 2, 1991

[54] PLUG OR CAP PULLER

[76] Inventors: Dennis I. Strausbaugh; Irvin R. Strausbaugh, both of R.D. 3, Box 306, Hanover, Pa. 17331

[21] Appl. No.: 529,554

[22] Filed: May 29, 1990

[51] Int. Cl.[5] .............................................. B23P 19/04
[52] U.S. Cl. ....................................................... 29/259
[58] Field of Search .................................... 29/259-262

[56] References Cited

U.S. PATENT DOCUMENTS

| | | | |
|---|---|---|---|
| 664,565 | 12/1900 | Livingood | 29/259 |
| 2,677,174 | 5/1954 | Lee | 29/259 |
| 2,992,478 | 7/1961 | Baker | 29/259 |
| 4,769,890 | 9/1988 | Maynard | 29/259 |
| 4,893,395 | 1/1990 | Crowder | 29/259 |

*Primary Examiner*—Robert C. Watson
*Attorney, Agent, or Firm*—Daniel J. O'Connor

[57] ABSTRACT

A tool assembly for removing caps or plugs from sewer lines to be connected by contractors or plumbers.

The tool includes three distinct pieces which may, in conjunction, be slid over a cap or plug to be removed.

A screw element is then turned to pull the cap or plug from a sewer line without damage to the cap or line itself.

The tool is designed for rapid attachment and use to reduce time consumed and danger to contractors and plumbers working on a sewer connection.

1 Claim, 1 Drawing Sheet

PLUG OR CAP PULLER

BACKGROUND AND OBJECTS OF THE INVENTION

Figure 1:
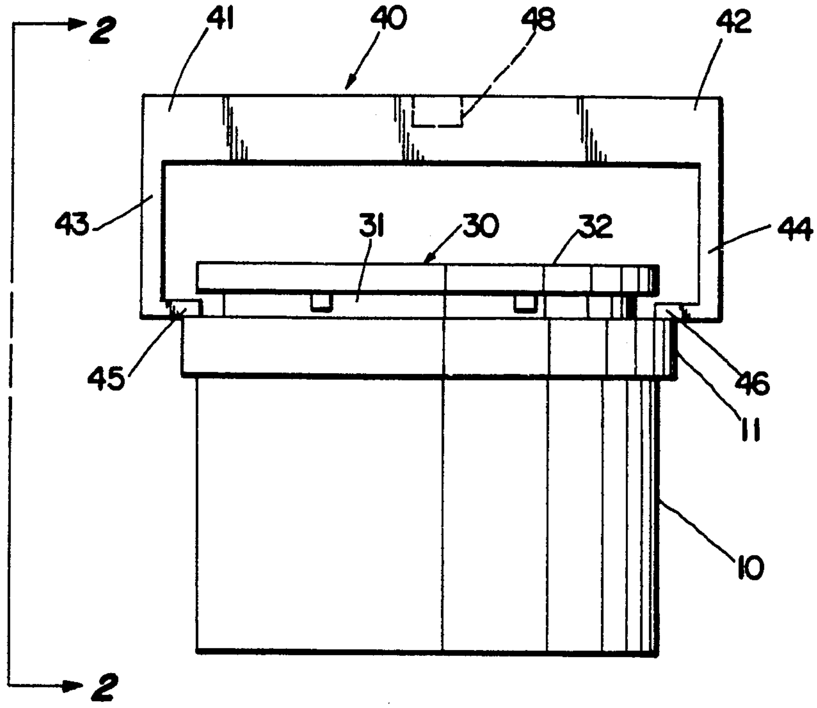

This invention is generally related to the closure removal arts and, in particular, is directed to a tool apparatus and method for easily removing a PVC plastic plug from a sewer pipe. As will be appreciated by those of skill in the art, the principles set forth will also have utility generally in the closure removal arts.

In modern-day home construction, a sewer line from the new home is typically sealed off or plugged to await connection to the main sewer drain line for the housing development. Such plugging is done via a PVC plastic device which is used to seal the sewer line.

At a later time, a professional plumber or sewer contractor must remove the plug to accomplish hook-up to the main sewer line.

The plug, being tightly fit into the pipe, is usually difficult to remove with known tools in the art. Such difficulty in removal often results in damage to the sewer pipe itself when tools such as hammers and chisels are used to remove the pipe plug.

The difficulty of plug removal is also time consuming and hence dangerous since the contractor is often working in a ditch which is subject to collapse during construction.

It would therefore be highly significant in the art to design a tool which could simply and easily remove a sewer pipe plug.

The need for an efficient means of sewer pipe plug removal has been recognized in the art in U.S. Pat. No. 4,691,424 issued to Schmidt et al in 1987. Such design has proven to be overly complex and costly. It has also proven to be not useable universally for the variety of sewer pipe plug arrangements encountered in typical home construction environments.

Accordingly, it is an object of the present invention to demonstrate a plug removing tool which may be economically manufactured and sold on a widespread basis.

It is also an object of the invention to set forth a plug removal tool which may be attached and used without damage to the sewer pipe itself.

It is a further object of the invention to demonstrate a plug puller tool by which the pipe plug can be quickly removed to save construction time and risk of injury to the plumbing contractor.

It is a still further object of the invention to set forth a puller tool which is of simplified construction so that it may be easily attached to the plug without the need for the complex tool assemblies of the prior art.

These and other objects and advantages of the present invention will be apparent to those of skill in the art from the description which follows.

PRIOR ART PATENTS

In U.S. Pat. Nos. 4,691,424 and 4,786,214 issued to Schmidt et al, a tool is shown which may be used for sewer pipe plug removal. As described, band elements 31 and 32 are required in this assembly. Such tool is not useable with many modern day sewer pipe connections since the widened gasket housing area is often at or very near the top of the sewer pipe. Thus, the required bands would effectively close off the area needed to be accessed and render the tool unuseable.

In contrast, the present design does not require a band element and is thus more universally useable.

Other U.S. Patents more remotely related are U.S. Pat. Nos. 3,551,988 issued to Berbel and 4,123,838 issued to Magavero. Both require complex pivoting and adjustment features which result in more time consumption in use and more expense in manufacture. Further, such systems would not have applicability to the sewer pipe plug removal for which the present invention is designed.

BRIEF DESCRIPTION OF THE DRAWING FIGURES

FIG. 1 shows a side elevational view of a lower portion of the tool to be used with a capped sewer pipe.

Figure 2:
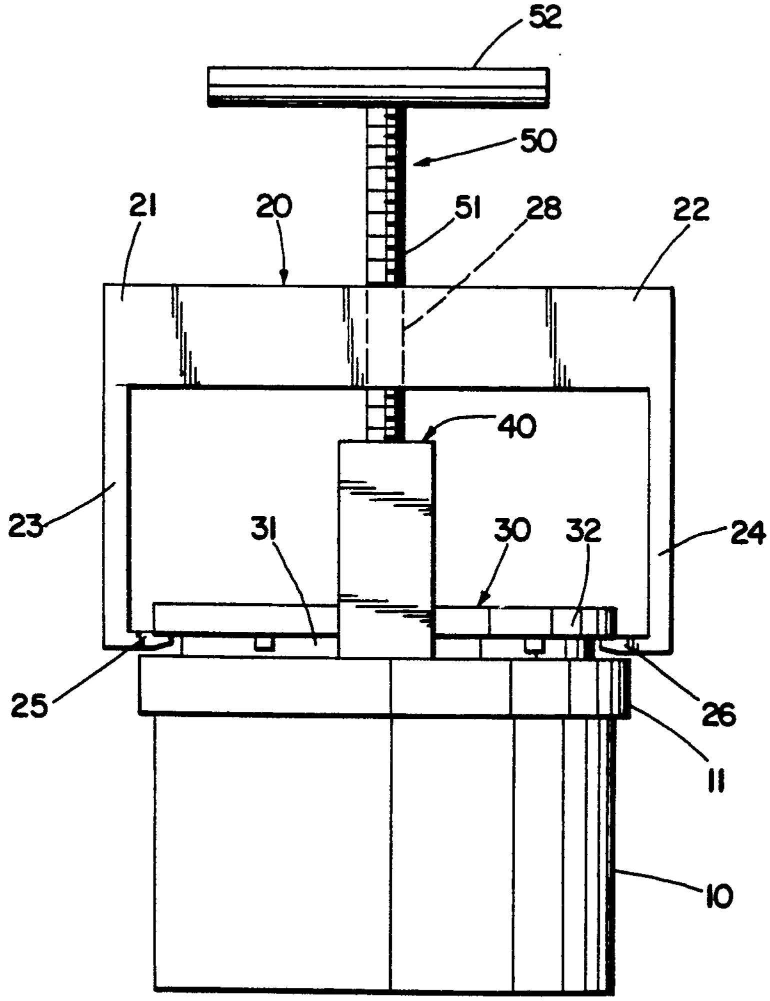

FIG. 2 shows a view along lines 2—2 of FIG. 1 which further shows the upper tool elements 20 and 50 in their desired position for removing a cap or plug 30.

BRIEF SUMMARY OF THE INVENTION

The invention consists of three separate elements which may be used in cooperating fashion to form a single tool for removing a pipe cap.

A first element consists of a lower pushing assembly which is laterally slid into position typically resting on a gasket housing portion of the upper end of a sewer pipe.

A second element comprises an upper pulling assembly which is laterally slid into position at the underside of a lid of a capping element on the sewer pipe.

A third element attached as a part of the upper pulling assembly is a screw assembly which is threaded through the upper pulling assembly.

Upon clockwise rotation of the screw assembly, a pushing force is exerted on the lower pushing assembly and hence a pulling force is exerted on the upper pulling assembly thus easily and rapidly lifting the cap or plug from its closure position.

As will be appreciated in the full description which follows, the simplicity of set-up and operation of the pulling tool renders the job of cap removal much less dangerous and time consuming than methods heretofore used in the art. The tool described is also designed to have utility with all currently known sewer pipe plugs.

FULL DESCRIPTION OF THE PREFERRED EMBODIMENT

Referring now to the drawing figures and, in particular to FIG. 1, a lower pushing assembly 40 is sized and positioned so that it is supported by a gasket housing 11 on the upper end of a sewer pipe 10. A cap or plug 30 to seal pipe 10 has a lid 32 and a body portion 31.

In many pipe uses, the gasket housing 11 is located at or very near the top of the sewer pipe 10. The importance of such location regarding the present invention and prior art tools will be further discussed herein.

As shown in FIG. 1, the lower pushing assembly 40 has a first lateral edge 41 and a second lateral edge 42.

Extending downwardly from the first lateral edge 41 is a vertical depending arm 43 which further has an inwardly extending arm 45 formed as a part thereof.

Extending downwardly from the second lateral edge 42 is a vertical depending arm 44 which further has an inwardly extending arm 46 formed as a part thereof.

For reasons to be further described, the lower pushing assembly 40 may further have an aperture 48 formed therein for receipt of the lower end of the screw assembly.

In the event that cap or plug 30 has a widened lid 32, the lower pushing assembly 40 is simply laterally slid, i.e. into the page, into its desired position resting on gasket housing 11 as shown in FIG. 1.

Referring now to FIG. 2, once the lower pushing assembly 40 is in its desired position, the upper pulling assembly 20 is laterally slid, i.e. into the page, into its desired position shown.

The upper pulling assembly 20 comprises a first lateral end 21 having a vertical arm 23 depending therefrom. The vertical arm 23 further has an inwardly extending arm 25 which is sized so as to fit underneath the cap or plug lid 32.

The upper pulling assembly 20 further includes a second lateral end 22 having a vertical arm 24 depending therefrom. The vertical arm 24 further has an inwardly extending arm 26 which is also sized so as to fit underneath the cap or plug lid 32.

The upper pulling assembly 20 further has a threaded hole, indicated at numeral 28 of FIG. 2, for receipt of a screw assembly 50.

The screw assembly 50 comprises a threaded screw cylinder 51 and an upper handle 52.

Upon installation of the upper pulling assembly 20, the screw assembly 50 is turned clockwise such that it bears down upon the lower pushing assembly 40. Note that the lower pushing assembly 40 may have an aperture 48 for receipt of the screw 51 as desired.

The lower pushing assembly 40 is thus pushed downwardly onto the gasket housing area 11.

As the screw is further turned clockwise, the upper pulling assembly 20 is moved up along the threaded area via counteractive force. The inwardly extending arms 25 and 26 of the upper pulling assembly thus gradually and without damage lift the cap or plug 30 from its sealed position inside the sewer pipe 10.

Once the cap or plug 30 is removed, the desired connection to the sewer pipe 10 can be effected.

As shown in the drawing figures, the gasket housing area 11 is located at or near the very top of the sewer pipe assembly 10 in many modern sewer line connections.

The present invention, as described and shown, is useable with such a gasket housing location. In contrast, tools of the prior art, which require that a supporting band be used and supported by a widened gasket housing, would not operate on modern sewer pipes since the required band would close off the area under the cap or plug needed to be reached. The present invention also simplifies manufacture and sale since the added expense of a band structure is not included in the present design.

As shown in the drawing figures, the upper pulling assembly 20 and the lower pushing assembly 40 are essentially each made of a one-piece design, i.e. the depending arms 23, 24 and 43, 44 are not pivoted about any point as are elements shown in the prior art. The solid resulting structure thus enhances stability and reduces breaking stresses as compared to prior art systems. The one-piece design also results in a more economically manufactured cap puller device.

As shown in FIG. 2, the upper pulling assembly 20 and the lower pushing assembly 40 are positioned at right angles to each other. In actual use of the device, the assemblies 20 and 40 could be positioned at virtually any angle relative to each other and still perform the cap pulling function effectively. For example, the assemblies 20 and 40 could be arranged in an X configuration and still operate as intended. Such feature enables the tool user to rapidly attach and use the cap puller thus saving time and reducing danger if the sewer pipe is located in a ditch subject to collapse.

From the foregoing description, it will be appreciated by those of skill in the art that an improved cap or plug puller has been set forth.

The simplified three-piece design renders the invention more readily manufactured and sold as compared to the more complex prior art systems.

The ease of use of the tool set forth also greatly reduces time consumed and danger to contractors and plumbers involved in work in the pipe connecting field.

The present inVention also greatly reduces the risk of damage to the sewer pipe itself so that a secure hook-up to the main sewer line can be effected.

With the above advantages, it is expected that the present design will have widespread commercial appeal.

While the tool set forth has been described in relation to sewer line cap or plug removal, it will be appreciated that the principles described may have widespread application to closure cap removal for many types of systems.

While a preferred embodiment of the invention has been shown and described, it is intended in this patent specification to protect all changes and modifications which come within the intended spirit of the invention.

We claim:

1. A tool means for removing a cap or plug (30) having a lid (32) from a sewer pipe assembly (10) having a widened gasket housing area (11) comprising, a lower pushing assembly (40) having a central portion, a first lateral edge (41) and a second lateral edge (42), a first vertical depending arm means (43) extending downwardly from said first lateral edge (41), a second vertical depending arm means (44) extending downwardly from said second lateral edge (42), wherein said first and second vertical depending arm means (43, 44) are fixedly formed as a part of said lateral edges (41, 42), means (45, 46) wherein said lower pushing assembly (40) rests on the upper edge of said widened gasket housing (11), an upper pulling assembly (20) having a central portion, a first lateral edge (21) and a second lateral edge (22), wherein said central portion of the upper pulling assembly (20) has an aperture (28) formed therethrough, a first vertical depending arm means (23) extending downwardly from said first lateral edge (21), a second vertical depending arm means (24) extending downwardly from said second lateral edge (22), wherein said first and second vertical depending arm means (23, 24) are fixedly formed as a part of said lateral edges (21, 22), means (25, 26) wherein extended portions of said upper pulling assembly (20) are fit under the lid (32) of said cap or plug (30), a screw assembly means (50) having a threaded cylinder (51) means adapted for extending through said aperture (28) formed in said central portion of the upper pulling assembly (20), handle means (52) attached to an upper portion of said threaded cylinder (51), means wherein, upon clockwise rotation of said handle (52), a pushing force is exerted by said lower pushing assembly (40) on the upper edge of said widened gasket housing (11) and wherein a pulling force is exerted by said upper pulling assembly (20) on the underside of the plug lid (32) wherein said plug is removed from said sewer pipe assembly (10), wherein said means (45, 46) by which said lower pushing assembly (40) rests on the upper edge of said widened gasket housing (11) comprise arms inwardly horizontally extending from said vertical depending arms (43, 44), said means (45, 46) being formed as a unitary construction with said arms (43, 44), wherein said means (25, 26) by which said upper pulling assembly (20) is fitted under the lid (32) of said cap or plug (30) comprise arms (25, 26) inwardly extending horizontally from said vertical depending arms (23, 24), said means (25, 26) being formed as a unitary construction with said arms (23, 24), wherein the central portion of said lower pushing assembly (40) includes a recessed area means (48) for receipt of the lower end of said screw cylinder (51), wherein said means (45, 46) whereby said lower pushing assembly (40) rests on the upper edge of said widened gasket housing (11) comprise shortened arm elements (45, 46) which do not extend to a body (31) of said cap or plug (30).

* * * * *